(12) United States Patent
Allam et al.

(10) Patent No.: US 9,546,814 B2
(45) Date of Patent: Jan. 17, 2017

(54) CRYOGENIC AIR SEPARATION METHOD AND SYSTEM

(75) Inventors: Rodney John Allam, Wiltshire (GB); Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 526 days.

(21) Appl. No.: 13/420,859

(22) Filed: Mar. 15, 2012

(65) Prior Publication Data

US 2012/0237881 A1    Sep. 20, 2012

Related U.S. Application Data

(60) Provisional application No. 61/453,381, filed on Mar. 16, 2011.

(51) Int. Cl.
| | | |
|---|---|---|
| F25J 1/00 | (2006.01) | |
| F25J 3/04 | (2006.01) | |
| F01K 25/10 | (2006.01) | |
| F23L 7/00 | (2006.01) | |

(52) U.S. Cl.
CPC ............ *F25J 3/0409* (2013.01); *F01K 25/103* (2013.01); *F23L 7/007* (2013.01); *F25J 3/04018* (2013.01); *F25J 3/04533* (2013.01); *F25J 3/04618* (2013.01); *F25J 2230/04* (2013.01); *F25J 2230/06* (2013.01); *F25J 2240/70* (2013.01); *F25J 2240/80* (2013.01); *F25J 2260/80* (2013.01); *F25J 2290/12* (2013.01); *Y02E 20/344* (2013.01)

(58) Field of Classification Search
CPC .... F25J 3/04018; F25J 3/04036; F25J 3/0409; F25J 3/04533; F25J 3/0406; F25J 2230/04; F25J 2230/06
USPC ........................................... 62/640, 643, 652
See application file for complete search history.

(56) References Cited

U.S. PATENT DOCUMENTS

| | | | |
|---|---|---|---|
| 4,342,201 A | 8/1982 | Ishii | |
| 4,461,154 A | 7/1984 | Allam | |
| 4,806,136 A | 2/1989 | Kiersz et al. | |
| 4,829,763 A * | 5/1989 | Rao ................................. 60/775 |
| 5,081,845 A | 1/1992 | Allam et al. | |
| 5,406,786 A | 4/1995 | Scharpf et al. | |
| 5,651,271 A | 7/1997 | Fraysse et al. | |

(Continued)

FOREIGN PATENT DOCUMENTS

| | | |
|---|---|---|
| FR | 2 919 717 | 2/2009 |
| FR | 2 956 478 | 8/2011 |

(Continued)

*Primary Examiner* — Frantz Jules
*Assistant Examiner* — Webeshet Mengesha
(74) *Attorney, Agent, or Firm* — Womble Carlyle Sandridge & Rice, LLP

(57) ABSTRACT

The present invention relates to a cryogenic air separation process that provides high pressure oxygen for an oxy-fired combustion of a fuel (e.g., a carbonaceous fuel). The air separation process can be directly integrated into a closed cycle power production process utilizing a working fluid, such as $CO_2$. Beneficially, the air separation process can eliminate the need for inter-cooling between air compression stages and rather provide for recycling the adiabatic heat of compression into a process step in a further methods wherein an additional heat supply is beneficial.

12 Claims, 1 Drawing Sheet

(56) References Cited

U.S. PATENT DOCUMENTS

| | | | |
|---|---|---|---|
| 5,724,805 A * | 3/1998 | Golomb et al. ............... 60/783 |
| 6,117,916 A * | 9/2000 | Allam et al. ................. 518/702 |
| 6,134,916 A | 10/2000 | Jahnke |
| 6,141,950 A * | 11/2000 | Smith et al. ................... 60/783 |
| 6,178,775 B1 * | 1/2001 | Higginbotham et al. ...... 62/646 |
| 6,256,994 B1 | 7/2001 | Dillon, IV |
| 6,263,659 B1 | 7/2001 | Dillon, IV et al. |
| 6,282,901 B1 | 9/2001 | Marin et al. |
| 6,345,517 B1 | 2/2002 | Jahnke |
| 6,360,561 B2 | 3/2002 | Allam et al. |
| 6,484,533 B1 | 11/2002 | Allam et al. |
| 6,568,185 B1 | 5/2003 | Marin et al. |
| 6,718,795 B2 | 4/2004 | Briglia |
| 6,745,573 B2 | 6/2004 | Marin et al. |
| 6,776,005 B2 | 8/2004 | Fuentes et al. |
| 6,945,052 B2 | 9/2005 | Frutschi et al. |
| 7,191,736 B2 * | 3/2007 | Goldman ............... F02B 43/02 123/1 A |
| 7,827,794 B1 | 11/2010 | Pronske et al. |
| 7,966,829 B2 | 6/2011 | Finkenrath et al. |
| 8,065,879 B2 | 11/2011 | Brugerolle et al. |
| 2001/0042386 A1 | 11/2001 | Allam et al. |
| 2002/0100293 A1 | 8/2002 | Prentice et al. |
| 2004/0002030 A1* | 1/2004 | Shah ..................... F23L 7/007 431/12 |
| 2004/0016237 A1 | 1/2004 | Marin et al. |
| 2007/0204620 A1* | 9/2007 | Pronske et al. ............... 60/671 |
| 2008/0034758 A1* | 2/2008 | Marin et al. ................... 60/783 |
| 2011/0179799 A1 | 7/2011 | Allam et al. |

FOREIGN PATENT DOCUMENTS

| | | |
|---|---|---|
| JP | S54-162678 | 12/1979 |
| JP | H10-267527 | 10/1998 |
| JP | H11-315727 | 11/1999 |
| WO | WO 2011/028322 | 3/2011 |

* cited by examiner

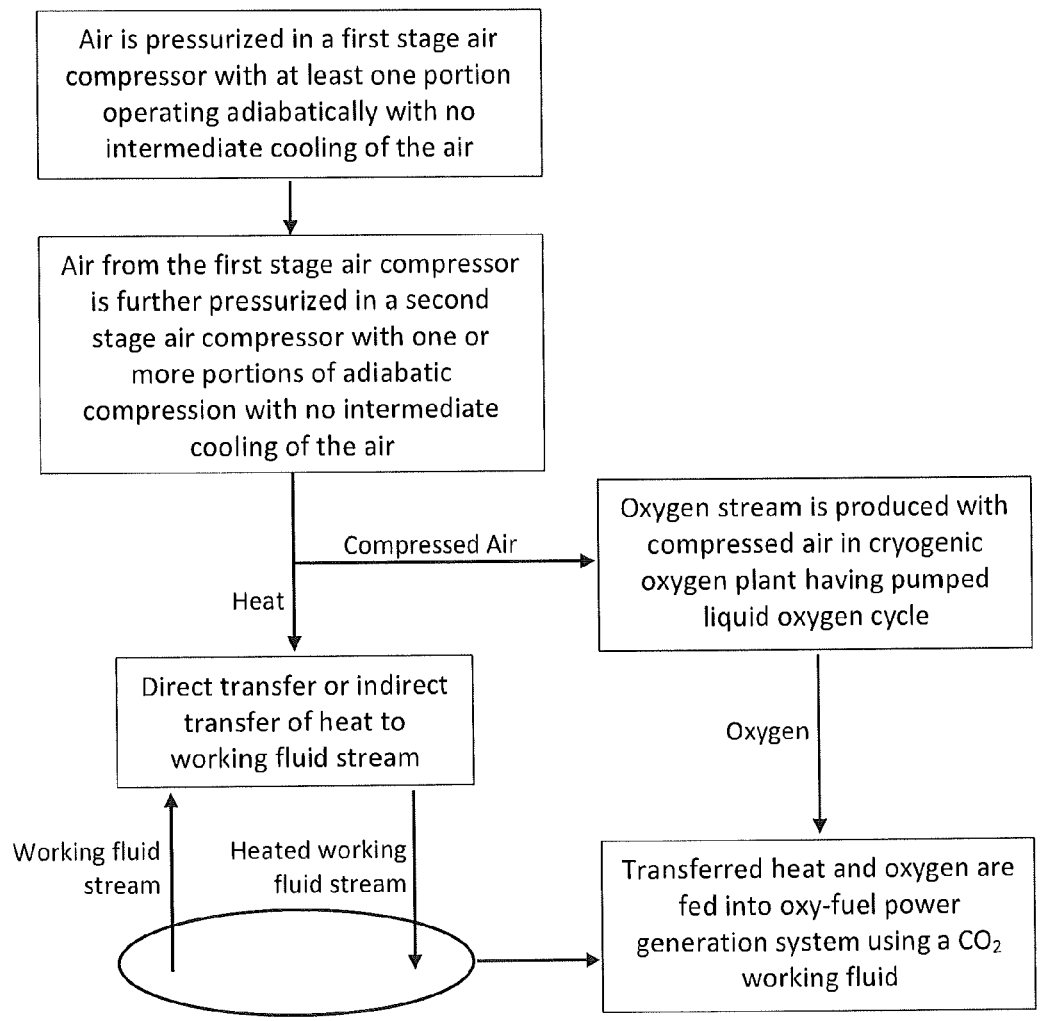

CRYOGENIC AIR SEPARATION METHOD AND SYSTEM

CROSS-REFERENCE TO RELATED APPLICATIONS

The present application claims priority to U.S. Provisional Patent Application No. 61/453,381, filed Mar. 16, 2011, the disclosure of which is incorporated herein by reference in its entirety.

FIELD OF THE INVENTION

The present invention is directed to methods and systems for separating air to provide a purified stream of one or more individual components thereof. Particularly, the methods and systems can be used to provide a purified $O_2$ stream while simultaneously withdrawing heat of compression for use in a different or related method or system.

BACKGROUND OF THE INVENTION

Atmospheric air is recognized to comprise a number of different gaseous components, primarily nitrogen and oxygen, but also minor amounts of other materials, such as noble gases, methane, water vapor, and carbon dioxide. One or more of the components of atmospheric air can be separated and provided in a purified form through use of an air separation method and system—i.e., an "air separation unit" or "air separation plant". There are various known technologies that are used for the separation process, such as cryogenic distillation of purified air, oxygen ion transport membrane (or other membrane) separation, pressure swing adsorption (PSA), and vacuum pressure swing adsorption (VPSA). Of the various available methods, cryogenic distillation can be particularly advantageous for the separation of air into its constituent parts at high purity. Known cryogenic air separation units achieve the low distillation temperatures required through use of a refrigeration cycle with the cold equipment maintained within an insulated enclosure. The cooling process and the separation of the air components typically requires a large amount of shaft power to drive the air compressors used in the refrigeration and separation cycles. Air separation units also can require initial separation of water vapor, $CO_2$, and other minor components to avoid freezing thereof within the cryogenic equipment.

A typical cryogenic air separation process can include four main features: air compression; air purification; heat interchange between cooling air streams and heating products of air separation; and distillation. In the compression stage, the total feed of atmospheric air is pre-filtered and compressed to a pressure typically from 3.5 to 10 bar (0.35 to 1 MPa). This compression stage imparts heat to the air, and such added heat must be removed (e.g., in a heat exchanger) to lower the compressed air temperature to around ambient temperature. The air is generally compressed in a multi-stage compressor with inter-cooling between stages and an after-cooler using an ambient cooling means, such as cooling water or air. The heat of compression is rejected to the environment. Purification of the compressed air can be achieved by passage through an adsorption process, such as cyclically operating beds of alumina and/or molecular sieve adsorbents. This can be useful to remove any remaining water vapor, $CO_2$, and any other components that would be subject to freezing in the cryogenic equipment, as well as gaseous hydrocarbons. The adsorbents can be regenerated by methods, such as thermal swing or pressure swing using dry nitrogen purge gas at low pressure. Cooling and distillation begins with passage of the air streams through an integrated heat exchanger (e.g., an aluminum plate fin heat exchanger) and cooling against produced oxygen and waste cryogenic product streams. The air is then cool enough to be distilled in a distillation column. The formation of liquid air in the cryogenic equipment typically requires some refrigeration. Such liquid may be formed by Joule Thomson expansion of air across a valve or through an expander. The air is distilled in at least one and often two or three distillation columns, depending on the requirements for products to be provided, product purities, and product delivery pressures. The separated air product components can be warmed against the incoming air in the heat exchangers to provide the product gases at ambient temperature.

The production of oxygen at elevated pressure is accomplished in all current cryogenic air separation systems using the pumped oxygen process. This involves pumping a stream of low pressure liquid oxygen taken from the distillation system to the high pressure required by a downstream oxygen consuming process. The high pressure liquid oxygen is vaporized and heated to ambient temperature by heat exchange with a portion of the air feed stream that has been compressed to a pressure sufficiently high to give a low temperature difference between the oxygen and air streams in the heat exchanger. Generally between about 27% and 40% of the purified total air feed stream is compressed in a second multi-stage air compressor to a pressure which depends on the required oxygen pressure. The air pressure can be about 27 bar (2.7 MPa) for oxygen at a pressure of 10 bar (1.0 MPa), and the air pressure can be about 100 bar (10 MPa) for oxygen at a pressure of about 300 bar (30 MPa).

Air separation units can be stand-alone systems providing bulk products for commerce. Alternately, air separation units can be integrated with other methods and systems where a continuous stream of products separated from the air is required. Specifically, air separation units can be integrated with combustion systems wherein fuel is combusted for power production and a purified $O_2$ stream is required to facilitate combustion. Because of the ever increasing need for power production in a growing world economy, there remains a need in the art for improved air separation methods and systems, particularly methods and systems that can be usefully integrated into power production methods and systems.

SUMMARY OF THE INVENTION

The present invention, in various embodiments, relates to a cryogenic air separation system and/or process that is useful for providing high pressure oxygen for use in one or more further processes, such as in an oxy-fired combustion of a fuel. Such combustion particularly can be carried out in a closed cycle power production process using a working fluid, particularly a $CO_2$ working fluid. The air separation system and/or process of the invention can be characterized by a number of specific advantages. For example, the air separation system and/or process can provide an $O_2$ stream with a molecular oxygen concentration of about 99.5% to about 90% molar, particularly about 99.5% to about 97% molar. In specific embodiments, the cryogenic oxygen production system and/or process can comprise a pumped liquid oxygen cycle that is effective to produce oxygen at pressures of about 20 bar (2 MPa) to about 500 bar (50 MPa), even in the absence of a dedicated oxygen compressor. The cryogenic air separation system and/or process further can comprise a first stage air compressor that is effective to produce air at a pressure of about 3 bar (0.3 MPa) to about 12 bar (1.2 MPa). Preferably, this first stage compressor is sufficient to deliver all of the air required by the air separation unit. The cryogenic air separation unit can further comprise a second stage air compressor that can be fed with about 25% to about 40% of the air delivered by the first stage air compressor, and the second stage compressor can be effective to pressurize the air to a pressure of up to about 150 bar (15 MPa). Preferably, both the primary and secondary air compressors can be operated without inter-cooling between one or more (including all) of the compressor stages. Each compressor can be operated without cooling between one or more (including all) of the compressor stages at adiabatic pressure ratios of about 2.5 or greater. The adiabatic heat of compression can be withdrawn from the compressed air stream that is discharged from each adiabatic section of the first and second stage compressors. Optionally, the entire compression of air in one or both of the first and second stage compressors can be carried out adiabatically with no inter-cooling of the air between stages. Optionally, there can be two, three, or even more separate adiabatic compression stages in one or both air compressors with compression ratios of about 2.5 or greater. The heat generated by compression in the adiabatic sections of the air compressors can be transferred at least in part either directly or indirectly to a part of a working fluid used in a power production process (e.g., a $CO_2$ working fluid).

In specific embodiments, the invention thus can relate to an air separation process for providing a purified, high pressure $O_2$ stream and a heated circulating stream. Such process can be characterized in relation to one or more of the following:

pressurizing air in a first stage air compressor to a pressure of about 3.5 bar (0.35 MPa) to about 12 bar (1.2 MPa);
  passing pressurized air from a first stage compressor to a second stage air compressor where the air is pressurized to a pressure of up to about 150 bar (15 MPa);
  utilizing multiple stages of air compressors having one or more sections being operated adiabatically with no inter-cooling;
  utilizing multiple stages of air compressors having one or more sections being operated with pressure ratios of about 2.5 or greater;
  transferring at least a portion of the adiabatic heat of compression of pressurized air delivered from one or more adiabatically operated sections of one or more air compressors to a working fluid stream (e.g., a $CO_2$ working fluid stream);
  cooling the pressurized air delivered from one or more air compressors (e.g., such as with ambient cooling means);
  feeding cooled air streams into a cryogenic air separation system to form a liquid $O_2$ stream with a molecular oxygen concentration of at least 90%;
  pumping the liquid $O_2$ stream to a pressure of about 20 bar (2 MPa) to about 500 bar (50 MPa);
  heating the high pressure oxygen stream together with other separated products to ambient temperature by heat exchange with the cooling and partially liquefying air streams; and
  purifying one or more cooled, pressurized air streams (preferably prior to feeding the air streams into a cryogenic air separation system), such as to remove $CO_2$, water, and trace contaminants.

As noted above, the working fluid stream may be a fluid stream (e.g., gas or liquid) comprising $CO_2$. For example, at least a portion of the heat of compression can be transferred to a working fluid stream taken from a power production process, such as a closed cycle circulating $CO_2$ working fluid. Alternately, a closed cycle intermediate heat transfer fluid can be used to facilitate the transfer of heat to the high pressure circulating $CO_2$ working fluid in the power cycle.

In certain embodiments, the invention particularly provides an air separation process for providing a purified $O_2$ stream and a heated working fluid stream. In an example embodiment, such process can comprise the following steps:

pressurizing air in a first stage air compressor to a pressure of about 3.5 bar (0.35 MPa) to about 12 bar (1.2 MPa);
  passing at least a portion of the pressurized air from the first stage compressor to a second stage air compressor where the air is further pressurized to a pressure of up to about 150 bar (15 MPa), wherein the first stage air compressor comprises at least one portion operating adiabatically with no intermediate cooling of the air and with a pressure ratio of 2.5 or greater, and wherein the second stage air compressor operates with one or more portions of adiabatic compression, each with a pressure ratio of about 2.5 or greater, the portions having no intermediate cooling of the air; and
  transferring heat from the adiabatically compressed air from each portion in the first and second stage air compressors to the working fluid stream such that the working fluid steam is heated and the adiabatically compressed air is cooled.

In further embodiments, the air separation process further can comprise feeding the cooled, compressed air streams from the first and second stage air compressors into a cryogenic oxygen plant having a pumped liquid oxygen cycle to produce an oxygen stream. Specifically, the produced oxygen stream can have a pressure of about 20 bar (2 MPa) to about 500 bar (50 MPa) and a purity of about 90% molar or greater, preferably about 97% molar or greater.

In still other embodiments, the air separation process further can comprise feeding at least a portion of the heat transferred from the adiabatically compressed portions of the air streams together with the oxygen into an oxy-fuel power generation system using a $CO_2$ working fluid.

Transferring of the heat from the adiabatically compressed air from each portion in the first and second stage air compressors to the working fluid stream can be carried out in a variety of manners, such as directly or indirectly. For example, the transferring step can comprise passing the adiabatically compressed air from each portion in the first and second stage air compressors through one or more heat exchangers where the working fluid stream is heated and the adiabatically compressed air is cooled. This is an example of direct transfer. Preferably, the heat exchanger transfers heat from the adiabatically compressed air to the working fluid stream in the temperature range of about 80° C. to about 500° C. In an example of indirect transfer, the transferring step can comprise contacting the adiabatically compressed air from each portion in the first and second stage air compressors with an intermediate circulating heat transfer fluid that transfers heat from the adiabatically compressed air to the working fluid stream. Again, it can be preferable for the intermediate circulating heat transfer fluid to transfer heat from the adiabatically compressed air to the working fluid stream in the temperature range of about 80° C. to about 500° C.

Further to the above, the adiabatically compressed portion of the pressurized air delivered from the compressors can be cooled to a specific temperature. For example, the pressurized air may be cooled to a temperature approaching that of a circulating fluid stream that is transferring heat either directly or indirectly to the $CO_2$ working fluid used in an oxy-fuel combustion power generation cycle—e.g., at a temperature of 80° C. or greater. This can heat a portion of the $CO_2$ circulating working fluid to a temperature of up to about 500° C.

The cooled, pressurized, purified air streams may particularly be separated via distillation. For example, the air streams may be passed into one or more distillation columns to separate oxygen from other air components and thus separate a liquid $O_2$ stream having the noted molecular oxygen concentration.

The separated liquid oxygen stream can be pressurized in a liquid pump and heated, if desired, to a specific temperature, such as about ambient temperature. This heating can be achieved through use of a suitable heat exchanger. Specifically, such heating can simultaneously cool one or more further streams from the air separation process, such as the air stream delivered from the second air compressor.

In further embodiments, the invention can relate to a power production process. Such process can be characterized by one or more of the following:

introducing a fuel, $O_2$, and a circulating (or working) fluid into a combustor;

combusting the fuel to provide a combustion product stream comprising the working fluid;

expanding the combustion product stream across a turbine to generate power;

withdrawing heat from the turbine discharge stream by passing the turbine discharge stream through a heat exchange unit to provide a cooled turbine discharge stream;

removing from the cooled turbine discharge stream one or more secondary components that are present in the cooled turbine discharge stream in addition to the working fluid to provide a purified, cooled turbine discharge stream;

compressing the cooled purified turbine discharge stream in a multistage compressor to provide a high pressure predominantly $CO_2$ stream;

removing from the $CO_2$ stream the $CO_2$ produced by the combustion of carbon present in the fuel at a pressure that can be between the inlet and outlet pressures of the compressor to produce a circulating $CO_2$ working fluid;

passing the $CO_2$ working fluid through the same primary heat exchange unit such that the withdrawn heat is used to increase the temperature of the $CO_2$ working fluid;

supplying an additional quantity of heat (e.g., externally generated heat from the air compressors of the cryogenic oxygen plant) to a portion the $CO_2$ working fluid;

recycling the total working fluid into the combustor.

pressurizing air in first and second air compressors that are operated with un-cooled adiabatic sections operated at pressure ratios of about 2.5 or greater;

transferring at least a portion of the adiabatic heat of compression of the pressurized air from the un-cooled sections to a circulating stream, the transferred heat comprising at least a portion of the additional quantity of heat that is supplied to the working fluid in the power production process;

purifying the compressed air streams, cryogenically cooling the pressurized air (e.g., against product $N_2$ and/or $O_2$ streams);

separating the air in one or more distillation columns to form a purified, liquid $O_2$ stream; and pumping the liquid $O_2$ stream to provide at least a portion of the $O_2$ that is introduced into the combustor.

In certain embodiments, the invention can provide an integrated power production process and air separation process. For example, such integrated process can comprise the following steps:

introducing a fuel, oxygen, and a $CO_2$ working fluid into a combustor;

combusting the fuel to provide a combustion product stream comprising the $CO_2$ working fluid;

passing the combustion product stream through a turbine producing shaft power so as to form a turbine discharge stream having a pressure that has a lower pressure than the combustion product stream;

passing the turbine discharge stream through a heat exchanger to cool the turbine discharge stream and heat a recycled $CO_2$ working fluid;

separating from the cooled turbine discharge stream one or more of water and impurities to provide a purified turbine discharge stream;

compressing the purified turbine discharge stream to form a compressed turbine discharge stream;

removing net $CO_2$ formed from the combustion of the fuel from the purified $CO_2$ stream to form the recycled $CO_2$ working fluid stream;

transferring at least a portion of the heat from an adiabatically compressed air stream to the recycled $CO_2$ working fluid stream so as to cool the adiabatically compressed air stream, which adiabatically compressed air stream is formed by the air separation process comprising:

pressurizing air in a first stage air compressor to a pressure of about 3.5 bar (0.35 MPa) to about 12 bar (1.2 MPa);

passing at least a portion of the pressurized air from the first stage compressor to a second stage air compressor where the air is further pressurized to a pressure of up to about 150 bar (15 MPa), wherein the first stage air compressor comprises at least one portion operating adiabatically with no intermediate cooling of the air and with a pressure ratio of 2.5 or greater, and wherein the second stage air compressor operates with one or more portions of adiabatic compression, each with a pressure ratio of about 2.5 or greater, the portions having no intermediate cooling of the air, and wherein the adiabatically compressed air stream is formed from each portion in the first and second stage air compressors; and passing the heated, recycled $CO_2$ working fluid stream into the combustor with the fuel and the oxygen.

In particular embodiments, the integrated power production process and air separation process can be characterized in that the transferring step comprises contacting the adiabatically compressed air stream and the recycled $CO_2$ working fluid stream with an intermediate circulating heat transfer fluid that transfers the heat from the compressed air stream to the recycled $CO_2$ working fluid stream. Specifically, the intermediate circulating heat transfer fluid can transfer heat from the adiabatically compressed air to the recycled $CO_2$ working fluid stream in the temperature range of about 80° C. to about 500° C.

In other embodiments, the integrated power production process and air separation process can be characterized in that the transferring step comprises passing the adiabatically compressed air stream through the heat exchanger wherein which the turbine discharge stream is cooled and the recycled $CO_2$ working fluid is heated such that at least a portion of the heat from an adiabatically compressed air stream is transferred to the recycled $CO_2$ working fluid stream to further heat the recycled $CO_2$ working fluid stream. Specifically, the heat exchanger can transfer heat from the adiabatically compressed air to the working fluid stream in the temperature range of about 80° C. to about 500° C.

In further embodiments the integrated power production process and air separation process can comprise feeding the cooled, adiabatically compressed air stream into a cryogenic oxygen plant having a pumped liquid oxygen cycle to produce an oxygen stream. For example, the produced oxygen stream has a pressure of about 20 bar (2 MPa) to about 500 bar (50 MPa) and a purity of about 90% molar or greater, preferably about 97% molar or greater.

In other embodiments, the integrated power production process and air separation process can further comprise feeding at least a portion of the heat transferred from the adiabatically compressed air stream together with the oxygen from the pumped liquid oxygen cycle into the power production process. Still further, the oxygen from the cryogenic air separation plant can be produced at a pressure of about 20 bar (2 MPa) to about 100 bar (10 MPa) and can be mixed with a portion of the purified turbine discharge stream to form a mixed $O_2/CO_2$ stream comprising about 20% to about 50% molar oxygen. Moreover, the process further can comprise compressing the mixed $O_2/CO_2$ stream to a pressure of about 100 bar (10 MPa) to about 520 bar (52 MPa), heating the compressed $O_2/CO_2$ stream in a separate pass in the heat exchanger to a temperature of about 500° C., and introducing the heated, compressed $O_2/CO_2$ stream as an oxidant into the combustor.

In specific embodiments, the integrated power production process and air separation process can be characterized in that the step of compressing the purified turbine discharge stream to form a compressed turbine discharge stream can comprise compressing from a beginning pressure of about 19 bar (1.9 MPa) to about 60 bar (6 MPa) to and ending pressure of about 100 bar (10 MPa) to about 520 bar (52 MPa).

In further embodiments the oxygen product from the air separation plant can be produced at a pressure of about 20 bar (2 MPa) to about 80 bar (8 MPa) and mixed with part of the circulating purified $CO_2$ stream taken from the $CO_2$ compressor inlet or from an inter-stage point to produce a mixed oxygen and $CO_2$ stream with an oxygen concentration of between 20% and 50% molar. This mixed stream can then be compressed to approximately the same pressure as the circulating high pressure $CO_2$ stream and both the mixed stream and the circulating $CO_2$ working fluid stream can be heated in separate passages in the heat exchanger with the mixed stream being heated to a temperature of about 500° C. or greater and used as the oxidant in the combustor to lower the adiabatic flame temperature.

In other embodiments, the invention specifically can provide an integrated power production and air separation system. Such integrated system can comprise the following components:

a multi-stage air compressor operable to pressurize air in a first stage to a pressure of about 3.5 bar (0.35 MPa) to about 12 bar (1.2 MPa) and pressurize air in a second stage to a pressure of up to about 150 bar (15 MPa), each stage comprising at least one portion configured for operating adiabatically with no intermediate cooling of the air and with a pressure ratio of 2.5 or greater;

a cryogenic oxygen plant configured to operate a liquid oxygen cycle that produces an oxygen stream;

a combustor configured for receiving oxygen from the cryogenic oxygen plant, fuel, and a $CO_2$ working fluid;

a power production turbine in fluid communication with the combustor;

a heat exchanger in fluid communication with the turbine;

one or more compressors in fluid communication with the turbine; and one or more heat transfer components operable to transfer heat from an air stream from the multi-stage air compressor to the heat exchanger, to a connector upstream of the heat exchange, or a connector downstream of the heat exchanger.

BRIEF DESCRIPTION OF THE DRAWING

Reference is now made to the accompanying drawing, wherein the FIGURE provides a flow diagram illustrating an air separation process for providing a purified $O_2$ stream and a heated working fluid stream.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention relates to air separation processes and associated systems that are particularly adapted for providing a purified product stream, particularly a purified $O_2$ stream, and further particularly a high pressure $O_2$ stream, from atmospheric air. The inventive methods and systems further are adapted for recovery of process heat that otherwise would not be utilized or that could actually function as a drain on the system in light of the requirement of secondary cooling systems to eliminate the by-product heat. The air separation methods and systems of the present invention can function as stand-alone units wherein a purified air product is formed and isolated. In particular embodiments, the air separation methods and systems can be integrated directly into a further process where one or more purified air products are used. Specifically, the air separation methods and systems can be integrated into power production processes wherein purified, high pressure $O_2$ is used in a combustion cycle and the recovered heat from air compressors providing feed air to the air separation plant also can be input to the combustion cycle to maximize overall efficiency of the cycle.

In one aspect, the present invention thus provides an air separation process for providing a purified air product stream, particularly a purified $O_2$ stream, and further particularly a high pressure stream. The air separation process further can provide a heated circulating stream that can function for direct or indirect heating of a stream in an associated process, as more fully described below.

The air separation process of the invention can comprise one or more of the following steps: filtering atmospheric air; compressing atmospheric air; purifying atmospheric air—e.g., for specific removal of water vapor and/or carbon dioxide and/or trace hydrocarbons; cooling the atmospheric air to cryogenic temperatures; separating the cooled air into one or more product streams (e.g., $O_2$ or $N_2$, and particularly liquid product streams), such as through distillation; compressing or pumping an individual air product stream to a pressure that is increased from ambient pressure; heating one or more product streams; and directing a stream of a purified air product for storage or for a particular, direct use. In certain embodiments of the present invention, one or more of the above steps may be expressly excluded from the inventive process.

In certain embodiments, the air separation methods of the invention can specifically encompass use of multi-stage compression to pressurize the atmospheric air. Preferably, one or more portions of the compressors can be operated adiabatically without cooling of the air between one or more (including all) of the stages. In known methods, it is generally recognized that the heat of compression must be withdrawn between compression stages to improve efficiency of the overall process. As more fully described herein, however, specific embodiments of the present invention make it desirable to preserve the heat of compression between stages so that the heat ultimately can be withdrawn after compression is complete at a higher temperature for provision of a viable heat source.

The various stages of the air compressor can be characterized as each having one or more portions. For example, the first stage air compressor can comprise at least one portion operating adiabatically with no intermediate cooling of the air and with a pressure ratio of 2.5 or greater. Similarly, the second stage air compressor can operate with one or more portions of adiabatic compression, each with a pressure ratio of about 2.5 or greater, the portions having no intermediate cooling of the air.

In certain embodiments, a two stage compression method can be used. In the first stage, the atmospheric air can be pressurized to a pressure of at least about 3.5 bars (0.35 MPa), at least about 4 bars (0.4 MPa), at least about 5 bars (0.5 MPa), or at least about 7 bars (0.7 MPa). More specifically, the invention can comprise pressurizing atmospheric air in the first stage compressor to a pressure of about 3.5 bar (0.35 MPa) to about 12 bar (1.2 MPa).

In the second stage compression, at least a portion of the pressurized air from the first stage compressor is passed to the second stage air compressor where the air is further pressurized. The percentage of the air passed to the second stage can be about 25% to about 40% of the pressurized air from the first stage compressor. The second stage compressor can be used to pressurize the air to a pressure of up to about 50 bar (5 MPa), up to about 75 bar (7.5 MPa), up to about up to about 100 bar (10 MPa), up to about 120 bar (12 MPa), or up to about 150 bar (15 MPa). In some embodiments, the pressure provided by the second stage compressor can be determined based upon the desired pressure at which the ultimate product stream (e.g., $O_2$ stream or $N_2$ stream) is to be provided. Preferably, the pressure used in the second stage compression is a pressure that results in the most efficient heat transfer between the pressurized air stream exiting the second compressor and the high pressure product stream.

The pressure of the second stage compressed air can be determined by the pressure of the product streams. In certain embodiments, the $O_2$ product stream provided according to the invention can be at a pressure of at least 100 bar (10 MPa), at least 150 bar (15 MPa), at least 200 bar (20 MPa), or at least 225 bar (22.5 MPa). In other embodiments, the product stream pressure can be about 150 bar (15 MPa) to about 500 bar (50 MPa), about 175 bar (17.5 MPa) to about 375 bar (37.5 MPa), about 200 bar (20 MPa) to about 350 bar (35 MPa), about 225 bar (22.5 MPa) to about 325 bar (32.5 MPa), or about 250 bar (25 MPa) to about 310 bar (31 MPa).

In further embodiments the oxygen product from the air separation plant can be produced at a pressure of about 20 bar (2 MPa) to about 100 bar (10 MPa) and mixed with a portion of the circulating purified $CO_2$ stream taken from the $CO_2$ compressor inlet or from an inter-stage point to produce a mixed oxygen and $CO_2$ stream with an oxygen concentration of about 20% to about 50% molar. This mixed stream can then be compressed to approximately the same pressure as the circulating high pressure $CO_2$ stream, and both the mixed stream and the circulating $CO_2$ working fluid stream can be heated in separate passages in the heat exchanger with the mixed stream being heated to a temperature of about 500° C. or greater and used as the oxidant in the combustor to lower the adiabatic flame temperature and safely allow pre-heating of a diluted oxygen stream rather than a pure oxygen stream.

In other embodiments the oxygen can be produced at the same pressure as the high pressure circulating $CO_2$ stream at the outlet of the $CO_2$ compressor and mixed with at least a portion of the high pressure $CO_2$ stream to produce a mixed oxygen and $CO_2$ stream with an oxygen concentration of about 20% to about 50% molar, and both the mixed stream and the circulating $CO_2$ working fluid stream can be heated in separate passages in the heat exchanger with the mixed stream being heated to a temperature of about 500° C. or greater and used as the oxidant in the combustor to lower the adiabatic flame temperature and safely allow pre-heating of a diluted oxygen stream rather than a pure oxygen stream.

Production of oxygen in the pumped oxygen cryogenic air separation plant can require a portion of the feed air to be compressed to a high enough pressure to provide a positive and low temperature difference between the evaporating and/or heating high pressure liquid oxygen stream and the cooling and/or condensing high pressure air stream from the second stage air compressor. For an oxygen pressure of about 25 bar (2.5 MPa) to about 30 bar (3 MPa), the air pressure of the second stage air compressor can be about 50 bar (5 MPa). For an oxygen pressure of about 300 bar (30 MPa), the air pressure can be about 100 bar (10 MPa).

The actual quantity of the pressurized air from the first stage compressor that is passed to the second stage compressor generally following purification of the total air stream can, in some embodiments, be determined based upon the desired heat transfer between the pressurized air stream exiting the second compressor and the high pressure product $O_2$ stream, as described above. In particular, the second stage compressor can be characterized, in specific embodiments, as having a primary function of providing a stream of high pressure air that transfers heat to the product $O_2$ stream leaving the pump in an efficient manner. Particularly, the heat transfer can be sufficient to raise the temperature of the product streams to near ambient. The second stage compressor flow-rate can vary between 25% and 40% of the total plant air feed depending on the oxygen pressure, the recovery factor of oxygen in the air feed, the temperature differences in the heat exchangers, and the amount of liquid products required from the plant. In specific embodiments, at least about 25% of the compressed air leaving the first stage compressor is passed to the second stage air compressor. More specifically, about 25% to about 40% of the compressed air leaving the first stage compressor can be passed to the second sage air compressor. Following air compression with portions of the second stage air compressor operating adiabatically at pressure ratios above 2.5, the compressed air is cooled using ambient cooling means before entering the heat exchanger of the cryogenic air separation plant.

One or both of the first and second stage compressors can comprise one or more sections wherein adiabatic compression proceeds at a desired pressure ratio. The pressure ratio can be determined based on the optimum design requirement for the amount and temperature level of the heat which is required to be transferred into the associated power production process. The pressure ratio used in the adiabatic compression section determines the outlet temperature of the air from that section. The heat is transferred in a heat exchanger which operates at a temperature approach to a circulating fluid stream which is transferring heat indirectly to a portion of the $CO_2$ working fluid used in an oxy-fuel combustion power generation cycle or directly to the $CO_2$ working fluid itself. The working fluid can be at an inlet temperature of about 80° C. or greater and can be heated to a temperature of up to about 500° C. Diatomic gases, such as $O_2$ and $N_2$, or predominantly diatomic gases such as air, can be characterized with a $C_p/C_v$ of about 1.4. The actual outlet temperature of the adiabatic section is a function of the inlet temperature, the pressure ratio, and the adiabatic efficiency of the compression section. The temperature to which the portion of the $CO_2$ circulating working fluid is heated is determined by the design temperature difference in the heat exchanger provided. The power cycle to which the adiabatic heat of compression is transferred is characterized by its requirement for a large additional heat input in the temperature range of about 80° C. to about 500° C. Such a power cycle is described in U.S. Patent Publication No. 2011/0179799A1, the disclosure of which is incorporated herein by reference in its entirety. The desired pressure ratio can be about 2.5 to about 40. Further theory regarding such pressure ratios is found in U.S. Pat. No. 4,461,154, the disclosure of which is incorporated herein by reference. In embodiments of the present invention, one or both of the first and second stage compressors can have one, two, or even three adiabatic sections characterized by pressure ratios in excess of about 2.5. These can be about 2.5 to about 40, about 2.5 to about 30, about 2.5 to about 20, about 2.5 to about 15, or about 2.5 to about 12. Generally, any pressure ratio above about 2.5 can be used up to the maximum ratio obtained from the maximum possible pressure ratio based on the defined inlet and outlet pressure of the second stage air compressor. In some embodiments, this can be a ratio of about 150:3.5. The selection of the number of sections and/or the pressure ratio can be determined by the required maximum temperature of the heat load that can be associated with the air compression process, as further described herein. For example, heat from the air compression process can be used to provide heating to a circulating stream in a power production process. When the heat delivered by the adiabatic sections of the air separation unit air compressors is used to at least partially heat such a circulating stream (i.e., circulating working fluid, or intermediate heat transfer fluid which transfers heat to the circulating working fluid), the maximum temperature of the heat load to be input to the circulating stream can form the basis for determining the proper number of adiabatic sections and the proper pressure ratio to be used. A higher temperature can require a higher pressure ratio which in turn can limit the number of adiabatic stages and hence the total quantity of heat transferred.

As noted above, the air compressors can be operated adiabatically without inter-cooling between the stages. Rather, in preferred embodiments, at least a portion of the adiabatic heat of compression of the pressurized air can be transferred to a circulating stream. For example, the stream of compressed air leaving the multi-stage compression may be passed through a heat exchanger wherein the adiabatic heat of compression can be transferred to a counter-stream. This counter-stream can thus exit the heat exchanger as a heated circulating stream. Such heated circulating stream may be a specifically chosen heat transfer fluid that allows the adiabatic heat of compression to be indirectly transferred to a further stream or process step in a different or related process. This particularly can arise in embodiments wherein the air separation process is integrated directly into a further process where a low level heat input is desirable. In alternate embodiments, a stream associated with the further process can directly function as the circulating stream so that the adiabatic heat of compression is directly transferred to the stream in the further process. The advantages of this heat transfer from the air compression can be more fully appreciated from the additional disclosure provided below.

The cooled, pressurized air from one or both of the first and second stage air compressors can undergo cryogenic cooling to form a liquid air stream that can be fed into a distillation section. Such cryogenic cooling can arise primarily from heat exchange with a previously cryogenically cooled product stream that is heated (such as to about ambient temperature) prior to distribution or storage. In some embodiments, the methods and systems can incorporate refrigeration components effective to provide initial cooling to a sufficiently low temperature to liquefy one or more components of the atmospheric air, specifically oxygen and/or nitrogen. Such refrigeration components may be used to provide make-up cooling when necessary to maintain a sufficiently low cryogenic processing temperature.

In preferred embodiments, distillation is used to separate the cooled, liquefied air into specific components. The present invention, however, encompasses the use of other separation methods (e.g., membrane separation, PSA, or VPSA), which of skill in the art may adapt for use in light of the disclosure provided herein. Distillation particularly can be used to provide a component stream with a desired purity level. For example, in specific embodiments, it is desirable to provide an $O_2$ stream with a molecular oxygen concentration of at least 90%, at least 95%, at least 97%, at least 98%, at least 99%, or at least 99.5%. In certain embodiments, the oxygen purity can be about 90% to about 99.5%, about 95% to about 99.5%, or about 97% to about 99.5%.

In some embodiments, it can be useful to provide a purified product stream (such as the purified $O_2$ stream) at a defined pressure. Such pressurization may be achieved through use of a separate oxygen compressor. In preferred embodiments, however, the desired pressure may be achieved expressly without the aid of a separate oxygen compressor. Specifically, the present invention can rely upon pumping of the liquid, purified $O_2$ stream within the cryogenic air separation unit to achieve the desired pressure. For example, a pump may be used wherein liquid oxygen enters an outer pump jacket and is therefrom taken into a pump cylinder and compressed out by a piston in the pump pressure stroke. Some of the liquid oxygen stream may evaporate due to heat produced in pumping, and such vapor may be passed out through a port. The high pressure liquid oxygen exiting the pump can pass through one or more non-return valves. Alternatively, a multi-stage centrifugal oxygen pump could be used. In specific embodiments, the liquid oxygen can be pumped to a pressure of greater than 20 bar (2 MPa), greater than 100 bar (10 MPa), or greater than 300 bar (30 MPa), up to a maximum of about 500 bar (50 MPa). Other product pressure ranges, as described above, also could be achieved via the discussed pumping means.

In some embodiments, the liquid $O_2$ stream (or other air product) may be heated for input into storage or input into a specific process. Thus, the method may comprise passing the liquid product stream through one or more heat exchangers to increase the temperature of the stream, such as to about ambient temperature. Specifically, the liquid product stream may be passed through the cold end of the heat exchanger used to cryogenically cool the atmospheric air stream and liquefy the components thereof, as described above. Apparatuses and methods relating to cryogenic air separation cycles to produce high pressure oxygen with the heating of pumped liquid oxygen using cooling high pressure air streams are described in U.S. Pat. No. 6,718,795, the disclosure of which is incorporated herein by reference in its entirety. The heating of the high pressure oxygen stream in a safe manner is described in U.S. Pat. No. 6,360,561, the disclosure of which is incorporated herein by reference in its entirety.

In various embodiments, the air separation process of the invention can be particularly useful in that it can be directly integrated with other processes where input of a purified air product, such as $O_2$, is useful. In specific embodiments, the air separation process of the present invention may be directly integrated with a power production process. Thus, the invention can provide a power production process that incorporates providing a purified high pressure $O_2$ stream and, optionally, a heated circulating stream that can be utilized in power production.

In particular embodiments, it may be advantageous for the air separation method to be integrated with a system or method incorporating the use of an associated working fluid (such as a $CO_2$ working fluid). Specifically, the use of a high pressure working fluid that has a high $CO_2$ recycle ratio can be advantageous for controlling various process parameters of a combustion cycle such that the desired combustion products can be easily used in power production. Moreover, such methods and systems provide the ability to completely eliminate atmospheric $CO_2$ emission and rather direct any desired portions of the $CO_2$ from the system for sequestration. The $CO_2$ working fluid likewise can be used in various further aspects in the methods and systems to maximize efficiency of the cycle.

In some embodiments, a $CO_2$ working fluid can be provided in a combustor along with the carbonaceous material and any additional materials useful in the combustions process. Specifically, a purified $O_2$ stream provided by the air separation process can be provided in the combustor along with the fuel and the working fluid. Such systems and methods can comprise a combustor that operates at very high temperatures (e.g., in the range of about 1,600° C. to about 3,300° C., or even greater), and the presence of the working fluid can function to moderate the temperature of a fluid stream exiting the combustor so that the fluid stream can be utilized in energy transfer for power production. The nature of the combustion process at high temperatures and pressures, and with high recycle $CO_2$ concentrations, can improve process efficiency by maximizing the flow through the power producing turbine and moderating the turbine inlet temperature to a range of about 800° C. to 1600° C. The oxygen used in the combustion process is provided in excess of the quantity required for stoichiometric combustion of the fuel components. The quantity of excess oxygen is about 0.1% to about 2% of the total stoichiometric oxygen requirement. The recycle $CO_2$ can be divided into two portions. The first can be mixed with the oxygen stream leaving the cryogenic air separation plant to produce a mixed $CO_2$ plus oxygen stream with a molar concentration of oxygen of about 20% to about 50%. The concentration of oxygen in the oxidant stream is fixed at a value that favors a moderate adiabatic combustion temperature in the range of 2,000° C. to about 3,000° C. This stream at near ambient temperature can be formed at a pressure corresponding to the pressure of the turbine exhaust stream that has been cooled in the heat exchanger and from which net water, $CO_2$ and other impurities derived from the oxidized fuel components have been removed. The mixed stream pressure can be about 20 bar (2 MPa) to about 50 bar (5 MPa). Alternatively it can be formed from $CO_2$ leaving the high pressure $CO_2$ recycle compression system at pressures of about 100 bar (10 MPa) to about 500 bar (50 MPa), or it can be formed from $CO_2$ taken from convenient stage discharge pressures in the $CO_2$ recycle compressor in the range of about 30 bar (3 MPa) to about 100 bar (10 MPa). The mixed stream can then be preheated in the heat exchanger to temperatures in excess of 500° C. safely (e.g., with minimal risk of oxygen/metal combustion taking place). This preheating improves combustion kinetics and also leads to reduction in heat exchanger surface area requirements with no loss of overall efficiency in the power production system. The second portion of the recycle stream is used to directly mix with the combustion products in the combustor/mixer to moderate the total mixed stream temperature to the range of about 800° C. to about 1,600° C. forming the turbine inlet flow.

The combustion product stream can be expanded across at least one turbine to generate power. The expanded gas stream then can be cooled in the power system heat exchanger to remove the desired components from the stream (such as net $H_2O$, $CO_2$, and oxidized impurities). The condensed water and impurities can be separated, and a net CO2 product from oxidized fuel carbon can be produced at a chosen pressure from the recycle compressor suction pressure to the discharge pressure. The heat withdrawn from the expanded gas stream can be used to heat the $CO_2$ working fluid that is recycled back to the combustor. Additional heat can be provided by the heated circulating stream derived from the adiabatic heat of compression in the air separation method. The recycled $CO_2$ working fluid advantageously can be used as a cooling fluid (or protecting fluid) for transpiration cooled (or transpiration protected) components of the system and method (e.g., the transpiration cooled combustor or transpiration cooled turbine components, such as turbine blades). Preferably, the $CO_2$ working fluid stream can be pressurized prior to recycle.

In certain embodiments, a power production process according to the present invention can comprise introducing a fuel, $O_2$, and a working fluid into a combustor, combusting the fuel to provide a combustion product stream comprising the working fluid, and expanding the combustion product stream across a turbine to generate power. The discharge stream from the turbine can be passed through a primary heat exchanger to withdraw heat therefrom and thus provide a cooled turbine discharge stream. Such cooling can be beneficial to simplify removal of one or more secondary components (e.g., water, carbon dioxide, nitrogen oxides, sulfur oxides, mercury, etc.) that are present in the cooled turbine discharge stream in addition to the $CO_2$ working fluid. After removal of the secondary components, the resultant purified, cooled turbine discharge stream primarily comprises the working fluid. By this can be meant that the working fluid comprises at least a majority of the purified, cooled turbine discharge stream. When the working fluid comprises $CO_2$, it can be beneficial according to the invention to withdraw a portion of the $CO_2$ for sequestration.

The compressed, purified working fluid can be passed through the same primary heat exchange unit such that the withdrawn heat from the turbine discharge stream is used to increase the temperature of the high pressure working fluid. In some embodiments, it can be useful to supply an additional quantity of heat to the working fluid so as to maximize the efficiency of the combustion cycle. The actual amount of additional quantity of heat that is supplied to the working fluid and its temperature level can vary by choice of pressure ratio in the adiabatic sections of the air compressors to maximize the overall power system efficiency which will depend on available power system heat exchanger surface area, which defines the minimum temperature differences that can be achieved at different temperature levels in the heat exchanger. The additional heat input can be introduced either directly (e.g., by circulating a portion of the high pressure recycle $CO_2$ stream through the heat exchangers used to cool the air from the adiabatic sections of the air compressors) or through the use of an intermediate circulating heat transfer fluid. The heat is introduced above a temperature level of the circulating high pressure $CO_2$ fluid of about 80° C. and must heat the $CO_2$ fluid up by a minimum temperature increment of about 50° C., such heating being up to a maximum overall temperature of about 500° C. In specific embodiments, the additional quantity of heat can be sufficient to ensure that the minimum temperature difference between the cooling turbine exhaust stream and the heating high pressure recycle $CO_2$ stream in the power plant heat exchanger is within at least about 20° C., within at least about 15° C., within at least about 10° C., within at least about 7° C., or within at least about 5° C. The heated working fluid then can further heated and be recycled into the combustor.

A power production method as described above specifically can integrate an air separation process as otherwise described herein. For example, the integrated air separation process can comprise the following steps: pressurizing air in two air compression units with at least part of each compressor having one or more stages of adiabatic compression with a pressure ratio of greater than about 2.5 operated without cooling of the air in each adiabatic stage; transferring at least a portion of the adiabatic heat of compression of the pressurized air to a circulating high pressure CO2 stream from the power production system; cryogenically cooling the pressurized purified air streams; separating the cooled partially liquefied air streams in a distillation system to form a liquid $O_2$ stream and a waste nitrogen stream; pumping the liquid $O_2$ stream to a high pressure in the range of about 20 bar (2 MPa) to about 500 bar (50 MPa); and heating the high pressure oxygen to near ambient temperature together with other separated air fractions against the cooling air streams to provide at least a portion of the $O_2$ that is introduced into the combustor. Moreover, the transferred adiabatic heat of compression can provide at least a portion of the additional quantity of heat that is supplied to the working fluid in the power production process, as described above.

In some embodiments, a coolant operating in a closed cycle may be used to withdraw the generated heat from the adiabatic compression sections of the air compressors used in the air separation process and provide the heat to the $CO_2$ working fluid. In other embodiments, the working fluid could be directly cycled through a heat exchanger positioned at a discharge of one or more of the adiabatic section of the air compressors in the air separation unit to withdraw part of the heat generated in the air compression process.

Integration of the present air separation unit and method into a combustion cycle as described above can be particularly beneficial because of the ability to provide high pressure $O_2$ to the combustion cycle. Combustion in such cycle is carried out at relatively high pressures, which can necessitate the ability to provide $O_2$ at an increased pressure. Specifically, it can be beneficial for the $O_2$ introduced into the combustor to have a pressure of at least 80 bar (8 MPa). In further embodiments, the $O_2$ introduced into the combustor can be at a pressure of at least 100 bar (10 MPa), at least 150 bar (15 MPa), at least 200 bar (20 MPa), at least 300 bar (30 MPa), or at least 500 bar (50 MPa). In the case of using a pure oxygen feed to the combustor, the burner design can involve dilution of the oxygen by recycled high pressure $CO_2$ within the burner or by recycled combustion product gas to moderate the adiabatic flame temperature within the burner system. An alternative arrangement is to dilute the oxygen with recycle $CO_2$ as described above.

In further aspects, the present invention can provide an air separation system comprising components as described above for producing a purified oxygen product stream and a heated circulating $CO_2$ fluid stream. The present invention also can provide a power production system comprising components as described above for combustion of a fuel in the presence of a working fluid and in the presence of an $O_2$ stream obtained from an air separation unit as described herein. The combustion system further can comprise components as described herein for withdrawing the adiabatic heat of compression from the air compression section of the air separation unit as an additional heat source for increasing efficiency of the power production process, particularly in relation to the re-heating of the high pressure recycled working fluid.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An air separation process for providing a purified $O_2$ stream and a heated working fluid stream comprising:
   pressurizing air in a first compressor to a pressure of about 3.5 bar (0.35 MPa) to about 12 bar (1.2 MPa);
   passing at least a portion of the pressurized air from the first compressor to a second compressor where the air is further pressurized to a pressure of up to about 150 bar (15 MPa), wherein the first compressor comprises at least one portion operating adiabatically with no intermediate cooling of the air and with a pressure ratio of 2.5 or greater, and wherein the second compressor is a multistage compressor with at least one stage operating adiabatically with no intermediate cooling at a pressure ratio of about 2.5 or greater, the first compressor and the second compressor thus forming adiabatically compressed air;
   transferring heat from the adiabatically compressed air from each of the compressors to a stream of a $CO_2$ working fluid from an oxy-fuel power generation system such that the stream of the $CO_2$ working fluid is heated and the adiabatically compressed air is cooled; and feeding the cooled, compressed air into a cryogenic oxygen plant having a pumped liquid oxygen cycle to produce an oxygen stream with a pressure of about 20 bar (2 MPa) to about 500 bar (50 MPa) and a purity of about 90% molar or greater.

2. The air separation process of claim 1, wherein the produced oxygen stream has a purity of about 97% molar or greater.

3. The air separation process of claim 1, wherein said transferring step comprises passing the adiabatically compressed air through one or more heat exchangers where the stream of the $CO_2$ working fluid is heated and the adiabatically compressed air is cooled.

4. The air separation process of claim 3, wherein the heat exchanger transfers heat from the adiabatically compressed air to the stream of a $CO_2$ working fluid in the temperature range of about 80° C. to about 500° C.

5. The air separation process of claim 1, wherein said transferring step comprises contacting the adiabatically compressed air with an intermediate circulating heat transfer fluid that transfers heat from the adiabatically compressed air to the stream of the $CO_2$ working fluid.

6. The air separation process of claim 5, wherein the intermediate circulating heat transfer fluid transfers heat from the adiabatically compressed air to the stream of the $CO_2$ working fluid in the temperature range of about 80° C. to about 500° C.

7. The air separation process of claim 1, wherein the produced oxygen stream is at a pressure of about 100 bar (10 MPa) to about 500 bar (50 MPa).

8. The air separation process of claim 1, comprising mixing at least a portion of the produced oxygen stream with $CO_2$ from the stream of the $CO_2$ working fluid to produce a mixed oxygen and $CO_2$ stream.

9. The air separation process of claim 8, wherein the mixed oxygen and $CO_2$ stream has an oxygen concentration of about 20% to about 50% molar.

10. The air separation process of claim 8, wherein the produced oxygen stream is at a pressure of about 20 bar (2 MPa) to about 100 bar (10 MPa), and the process further comprises compressing the mixed oxygen and $CO_2$ stream to a pressure of up to about 500 bar (50 MPa).

11. The air separation process of claim 8, further comprising passing at least a portion of the mixed oxygen and $CO_2$ stream to a combustor in the oxy-fuel power generation system.

12. The air separation process of claim 1, further comprising passing a least a portion of the produced oxygen stream and at least a portion of the heated stream of the $CO_2$ working fluid to a combustor in the oxy-fuel power generation system.

* * * * *